United States Patent
Shiota et al.

(10) Patent No.: US 9,899,842 B2
(45) Date of Patent: Feb. 20, 2018

(54) CONTROL METHOD AND CONTROL SYSTEM FOR PARALLEL OPERATION BETWEEN DIFFERENT TYPES OF POWER GENERATOR

(71) Applicants: KAWASAKI JUKOGYO KABUSHIKI KAISHA, Kobe-shi, Hyogo (JP); DAIICHI TECHNO CO., LTD., Tokyo (JP)

(72) Inventors: Yukihiro Shiota, Kakogawa (JP); Mitsuru Chida, Akashi (JP); Kazunori Sato, Himeji (JP); Koushichi Tateishi, Shinagawa-ku (JP)

(73) Assignees: KAWASAKI JUKOGYO KABUSHIKI KAISHA, Kobe-shi, Hyogo (JP); DAIICHI TECHNO CO., LTD., Shinagawa-ku, Tokyo (JP)

( * ) Notice: Subject to any disclaimer, the term of this patent is extended or adjusted under 35 U.S.C. 154(b) by 311 days.

(21) Appl. No.: 14/653,422

(22) PCT Filed: Dec. 18, 2013

(86) PCT No.: PCT/JP2013/083822
§ 371 (c)(1),
(2) Date: Jun. 18, 2015

(87) PCT Pub. No.: WO2014/098104
PCT Pub. Date: Jun. 26, 2014

(65) Prior Publication Data
US 2015/0333519 A1    Nov. 19, 2015

(30) Foreign Application Priority Data

Dec. 21, 2012 (JP) .................... 2012-279658

(51) Int. Cl.
*H02J 3/38* (2006.01)
*H02J 3/46* (2006.01)
(Continued)

(52) U.S. Cl.
CPC ............. *H02J 3/381* (2013.01); *H02J 3/46* (2013.01); *H02P 5/00* (2013.01); *H02P 9/02* (2013.01); *Y10T 307/505* (2015.04)

(58) Field of Classification Search
CPC ....................................................... H02J 3/381
(Continued)

(56) References Cited

U.S. PATENT DOCUMENTS 8,946,928 B2   2/2015   Boe
9,391,458 B2   7/2016   Chida et al.
(Continued)

FOREIGN PATENT DOCUMENTS

CN   101098079 A   1/2008
EP   2192681 A1   6/2010
(Continued)

OTHER PUBLICATIONS

International Preliminary Report on Patentability dated Jun. 23, 2015 from the International Bureau in counterpart International Application No. PCT/JP2013/083822.
(Continued)

*Primary Examiner* — Joseph Chang
(74) *Attorney, Agent, or Firm* — Sughrue Mion, PLLC

(57) ABSTRACT

In a control method performed in shifting a plurality of different types of power generators to parallel operation, at least one of output voltage and a voltage drooping characteristic of at least one of the plurality of power generators is changed. In the case where the plurality of different types of power generators are a plurality of synchronous power generators having different voltage drooping characteristics,
(Continued)

the voltage drooping characteristic of one power generator having a smaller voltage drooping characteristic among the plurality of power generators to be operated in parallel is changed so as to coincide with the voltage drooping characteristic of the other power generator. At the time of changing the voltage drooping characteristic, the other power generator is controlled so that the output voltage thereof is maintained at a value before start of the parallel operation.

2 Claims, 12 Drawing Sheets

(51) Int. Cl.
  *H02P 9/02* (2006.01)
  *H02P 5/00* (2016.01)
(58) Field of Classification Search
  USPC .......................................................... 307/44
  See application file for complete search history.

(56) References Cited

U.S. PATENT DOCUMENTS

| | | | |
|---|---|---|---|
| 2007/0273342 | A1 | 11/2007 | Kataoka et al. |
| 2008/0103632 | A1 | 5/2008 | Saban et al. |
| 2009/0108678 | A1* | 4/2009 | Algrain .................. H02J 3/005 307/87 |
| 2011/0254368 | A1 | 10/2011 | Boe |
| 2014/0152112 | A1 | 6/2014 | Chida et al. |

FOREIGN PATENT DOCUMENTS

| | | |
|---|---|---|
| EP | 2725677 A1 | 4/2014 |
| JP | 57-121997 A | 7/1982 |
| JP | 57-160331 A | 10/1982 |
| JP | 61-142931 A | 6/1986 |
| JP | 63-181621 A | 7/1988 |
| JP | 2-65045 U | 5/1990 |
| JP | 2000-262096 A | 9/2000 |
| JP | 2005-354861 A | 12/2005 |
| WO | 2012176771 A1 | 12/2012 |

OTHER PUBLICATIONS

Communication dated Jun. 30, 2016 from the Korean Intellectual Property Office in counterpart application No. 10-2015-7015896.
Zhu, Zhipeng, "Voltage Adjusting Characteristics and Governing Behavior, and Load Sharing for Parallel Operation of Modern Practical Synchronous Power Generators", Electrotechnical Application, Feb. 2011.
Communication dated Nov. 30, 2016, from the Chinese Patent Office in counterpart Chinese Application No. 201380067081.0.
International Search Report for PCT/JP2013/083822 dated Mar. 25, 2014 [PCT/ISA/210].
Communication dated Aug. 10, 2016, from the European Patent Office in counterpart European Application No. 13865962.8.
Gary Olsen: "Paralleling Dissimilar Generators: Part 3—Load Sharing Compatibility Our energy working for you. TM White Paper topic #9017, Technical information from Cummins Power Generation", Jan. 1, 2011, pp. 1-6.
Communication dated Aug. 23, 2016, from the Japanese Patent Office in counterpart application No. 2014-553166.
Communication dated Aug. 2, 2017 from the State Intellectual Property Office of the P.R.C. in counterpart application No. 201380067081.0.
Communication dated Nov. 9, 2017 from the European Patent Office in counterpart European application No. 13865962.8.

* cited by examiner

CONTROL METHOD AND CONTROL SYSTEM FOR PARALLEL OPERATION BETWEEN DIFFERENT TYPES OF POWER GENERATOR

CROSS REFERENCE TO THE RELATED APPLICATION

This application is a National Stage of International Application No. PCT/JP2013/083822, filed on Dec. 18, 2013, which claims Convention priority to Japanese patent application No. 2012-279658, filed Dec. 21, 2012, the entire disclosure of which is herein incorporated by reference as a part of this application.

BACKGROUND OF THE INVENTION

Field of the Invention

The present invention relates to a control method for stably performing parallel operation between different types of power generators or between a power generator and a system power supply, and to a control system therefor, and particularly relates to a voltage control method performed in shifting to parallel operation and a voltage control system used in shifting to parallel operation.

Description of Related Art

Generally, in various power supply facilities, power generators that are normally operated and power generators that are operated in an abnormal case or in an emergency case are separately used according to the types of engines or mechanisms thereof, and power generators different in types or characteristics are not operated in parallel. However, in such a case where a part of a device that is normally operated has failed or a peak-cut operation by a standby machine is desired because of great load variation, it is general to perform parallel operation of power generators of the same type including a standby machine, for which adjustment has been performed in advance so that they have the same frequency drooping characteristic and the same voltage drooping characteristic.

Conventionally, while a synchronous power generator is used as a self-sustaining power generator, an induction power generator incapable of independent operation is used only in an operation interconnected with a large system power supply such as commercial power supply.

Upon arbitrary operation interruption of each power generator composing a power supply system, or in a power supply facility of natural energy collecting type whose operation greatly varies depending on time, an ambient environment, or the like, an output voltage drooping characteristic on a power supply side and impedance on a system power supply side always vary depending on combined power supply specifications.

RELATED DOCUMENT

Patent Document

[Patent Document 1] JP Laid-open Patent Publication No. 2005-354861

SUMMARY OF THE INVENTION

Thus, in the case of performing parallel operation between a plurality of power generators, in order to equalize load share of active current and reactive current between the power generators over a range from light load to full load in accordance with power generator capacities, it is necessary to make output voltage drooping characteristics (characteristics in which output voltage reduces as a load increases) of both power generators coincide with each other. Therefore, conventionally, in the case of different types of power generators, they are operated in a state in which the power generator having a better voltage drooping characteristic in which output voltage reduction due to load increase is less has been adjusted to have the characteristic of the power generator having a worse voltage drooping characteristic, irrespective of whether the power generators are performing independent operation or parallel operation, and parallel operation between the power generators or solo independent operation after release is performed without changing the voltage drooping characteristics during the operation. Therefore, in independent operation, the original performance of the power generators and motors for driving the power generators cannot be exerted, and thus effective operation is hindered.

Regarding an induction power generator, it is not easy for a small-capacity synchronous power generator that is performing independent operation to bear inrush current caused when the induction power generator is applied to parallel operation, and starting current due to the application to parallel operation greatly exceeds a rated current value of the synchronous power generator. Therefore, parallel operation with the synchronous power generator is not performed as described above. The same holds true for full-voltage starting of an induction motor. Also in a self-sustaining power conditioner, or a UPS power supply device performing independent operation, it is difficult to perform an operation with induction load, which causes large starting current.

For the above-described power supply facility interconnected with a system power supply, a control method and a control system are required which arbitrarily change a voltage drooping characteristic of a power generator to be operated in parallel with the system side, in accordance with change in a system-side power supply (a power generation facility that composes the system and is being operated) of a power generator composing the power supply facility, thereby performing optimum switching in accordance with characteristics between the power generators composing the power supply facility.

Accordingly, an object of the present invention is to provide a voltage control method and a voltage control system for performing, stably and with high efficiency, parallel operation between different types of power generators or between a power generator and a system power supply.

In order to achieve the above object, a control method or a control system is for parallel operation between different types of power generators according to the present invention, in which the control is performed in shifting a plurality of different types of power generators to a parallel operation, and includes changing at least one of output voltage and a voltage drooping characteristic of at least one of the plurality of power generators.

This configuration makes it possible to stably perform parallel operation between synchronous power generators having different voltage drooping characteristics, parallel operation between a synchronous power generator and an induction power generator, and parallel operation between a synchronous power generator and a system power supply, although, conventionally, such operations are difficult.

In the control method or the control system for parallel operation between different types of power generators according to one embodiment of the present invention, the plurality of different types of power generators are a plurality of synchronous power generators having different voltage drooping characteristics. The control method or the control system may control output voltage in shifting the plurality of power generators from an independent operation of each of the power generator under respective different voltage drooping characteristic thereof to the parallel operation, and may change the voltage drooping characteristic of one power generator having a smaller voltage drooping characteristic among the plurality of power generators to be operated in parallel, so as to coincide with the voltage drooping characteristic of the other power generator; and may control, at the time of changing the voltage drooping characteristic, the other power generator so that the output voltage thereof is maintained at a value before start of the parallel operation.

This configuration makes it possible to, even from a state in which the power generators are individually operating with their respective optimum voltage drooping characteristics, perform operation based on a capacity ratio of each power generator without causing unbalance of load current between the power generators after shifting to parallel operation. That is, it becomes possible to shift to parallel operation while suppressing occurrence of load unbalance. Therefore, it is possible to stably perform parallel operation between different types of power generators or between a power generator and a system power supply without loss of performance of each power generator.

In the control method or the control system for parallel operation between different types of power generators according to an embodiment of the present invention, one of the plurality of power supply devices is a synchronous power generator and the other one is an induction power generator. The control may be performed in shifting the synchronous power generator which has been performing independent operation beforehand, and the induction power generator to parallel operation. The control method or the control system may set, in response to a signal to start the parallel operation, an output voltage of the synchronous power generator to a value smaller than an output voltage value in the independent operation. Alternatively, the control method or the control system may set, in response to a signal to start the parallel operation, a droop rate of a voltage drooping characteristic of the synchronous power generator to a value greater than a droop rate in the independent operation.

This configuration makes it possible to, even in the case where a synchronous power generator, and an induction power generator accompanied with large starting current are operated in parallel, suppress occurrence of instantaneous excessive current at the start of the parallel operation by arbitrarily changing the voltage drooping characteristic or the voltage setting value of the synchronous power generator, thus enabling stable shifting to parallel operation.

In the control method or the control system for parallel operation between different types of power generators according to an embodiment of the present invention, one of the plurality of power supply devices is a synchronous power generator and the other one is a system power supply. The control method or the control system may reduce an output voltage command value for the synchronous power generator in accordance with an amount of the voltage reduction, when voltage reduction exceeding a voltage drooping characteristic of the synchronous power generator has occurred in the system power supply. Alternatively, the control method or the control system may set a droop rate of the voltage drooping characteristic of the synchronous power generator to a value greater than a droop rate in the independent operation, when voltage reduction exceeding a voltage drooping characteristic of the synchronous power generator has occurred in the system power supply.

When voltage reduction has occurred on the system power supply side, flow of excessive current and load of the excessive current continue in the interconnected power generator, and an internal phase angle in the power generator expands with time. Further, the power generator may lead to step-out. On the other hand, when voltage on the system power supply side is returned in a state in which the internal phase angle has expanded, depending on the expansion state of the internal phase angle, an asynchronous event occurs due to expansion of a phase difference between the system power supply and the power generator, whereby large impact occurs. In addition, when return from the voltage reduction in the system power supply is further delayed and the internal phase angle continues to expand, the power generator leads to step-out, so that it becomes difficult to continue the interconnected operation. For such an event, the above configuration makes it possible to suppress occurrence of excessive current due to voltage reduction in the system power supply, and prevent step-out due to expansion of the internal phase angle of the power generator operated in parallel with the system power supply, thus stably maintaining parallel operation even after voltage of the system power supply is returned. Standards relevant to system interconnection in respective countries require maintaining operation for about 1 to 3 sec even upon occurrence of great voltage reduction. The above configuration also makes it possible to satisfy such standards.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, embodiments of the present invention will be described based on the drawings.

Figure 1:
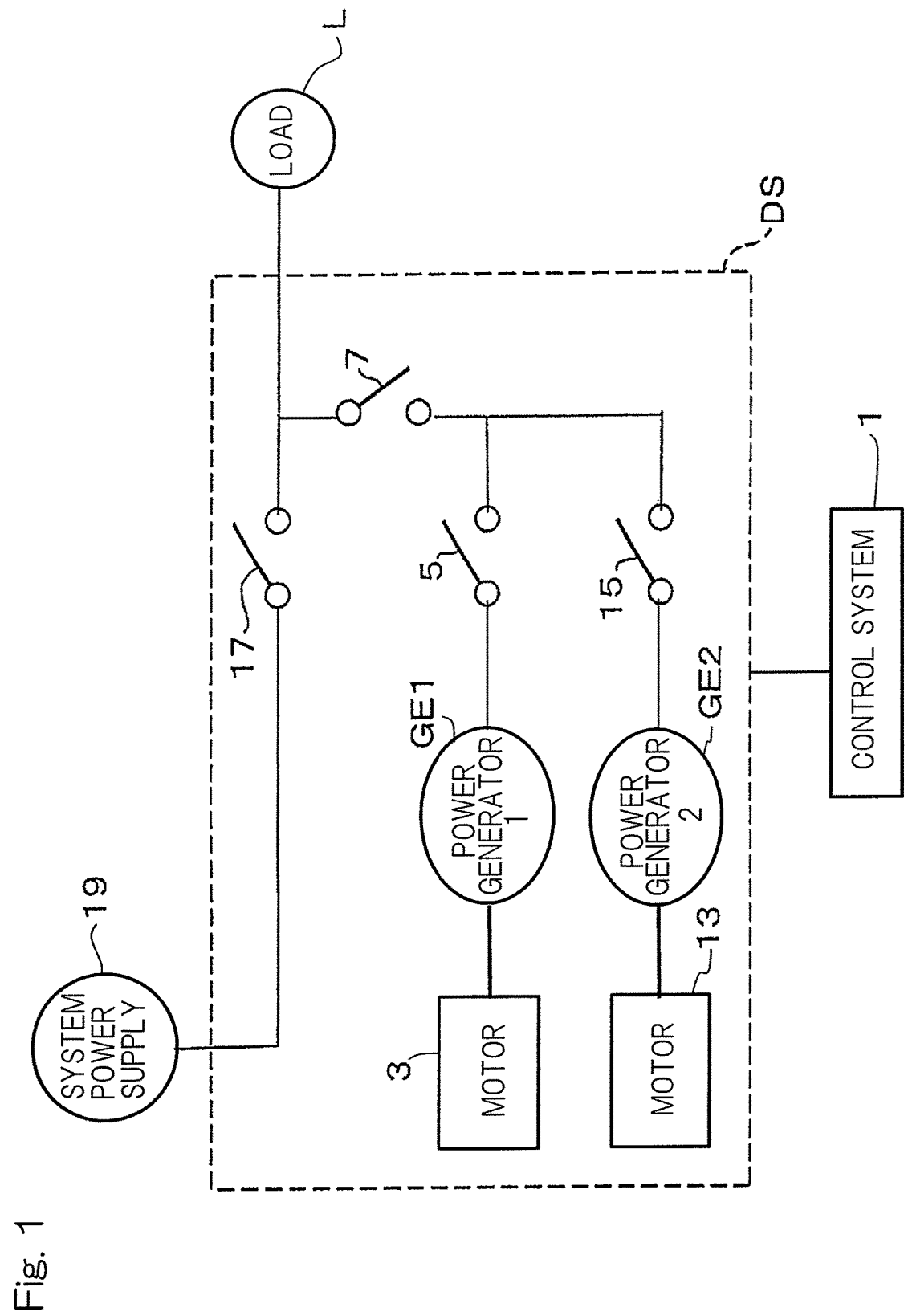
FIG. 1 is a block diagram showing a schematic configuration of a drive system of an apparatus equipped with a control system for executing a method according to an embodiment of the present invention.

FIG. 1 shows a schematic configuration of a drive system DS of an apparatus equipped with a control system 1 according to an embodiment of the present invention. The control system 1 is a system for executing a control method according to the embodiment of the present invention. The control method is a control method performed when a plurality of different types of power generators or a power generator and a system power supply having different voltage drooping characteristics, which are characteristics in which output voltage reduces as a load increases, are shifted from respective individual operations thereof to parallel operation for driving the same drive target.

As used herein, "power generators" to be operated in parallel include, as well as a synchronous power generator of electromagnetic induction type which is driven by a motor having a rotating machine, e.g., a gas turbine engine or a diesel engine, any types of power generators capable of independent operation, such as a stationary power generator having no rotating machine, e.g., a fuel-cell power generator or a solar power generator (including a solar cell), and further include an induction power generator and a system power supply (commercial power supply). As used herein, "parallel operation" includes interconnected operation in the case where one of the power generators is a system power supply. As a motor for driving a power generator of electromagnetic induction type, a device having a rotating machine for which output voltage can be operated, such as a gas turbine engine, a diesel engine, a wind turbine, or a water turbine, may be used.

As a configuration example of different types of synchronous power generators, a first power generator GE1 driven by a first motor (for example, a gas turbine engine) 3 is connected to a load L which is a drive target, via a first shut-off switch 5 and a connection shut-off switch 7. On the other hand, a second power generator GE2 driven by a second motor (for example, a diesel engine) 13 is connected to the load L via a second shut-off switch 15 and the connection shut-off switch 7. The load L is connected to a system power supply 19 via a system shut-off switch 17, independently of the power generators GE1 and GE2.

The control method according to the present embodiment, when the first power generator GE1 and the second power generator GE2 are shifted to parallel operation, as well as determining a voltage drooping amount of the counterpart power generator from a voltage drooping characteristic of each power generator, determines a voltage setting value from a load on the power generator of one type (here, for example, the first power generator GE1) so that the load becomes a load obtained by subtracting a load on the power generator of the other type (here, for example, the second power generator GE2) from a desired load, changes the voltage drooping characteristic of the first power generator GE1 so as to coincide with the voltage drooping characteristic of the second power generator GE2, and controls the first power generator GE1 so that output voltage thereof is maintained in the changing of the drooping characteristic.

Figure 2:
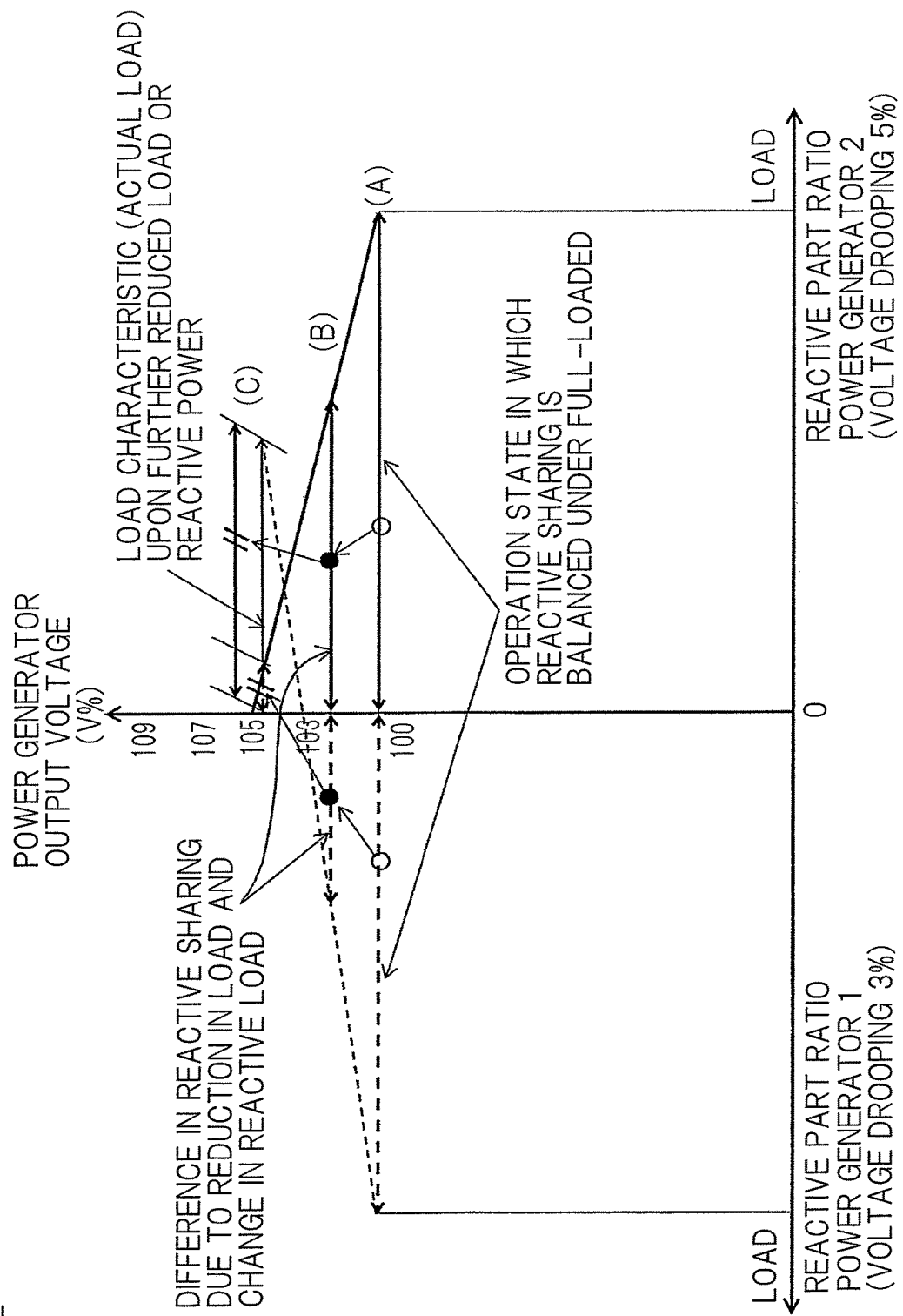
FIG. 2 is a graph showing a state in which voltage drooping characteristics of different types of power generators are different from each other.

FIG. 2 shows sharing of reactive current between the power generators GE1 and GE2 with respect to the load. A drooping base point of the first power generator GE1, i.e., output voltage thereof with no load, and a drooping base point of the second power generator GE2 with no load are different from each other, and are respectively, for example, 103% and 105% with respect to output voltage with no load. Therefore, the drooping characteristics of the first power generator GE1 and the second power generator GE2, which are output voltage reduction rates from a full-load state (state (A)) with respect to a no-load state, are 3% and 5%, respectively, thus being different from each other. In this case, for example, in response to load amount variation caused when reactive part of the load varies, balance of current output share between the power generators is lost (state (B)), resulting in the need of adjusting generated voltage. Then, when the load is instantaneously reduced due to the adjustment for the reactive part (state (C)), cross current flows to the power generator (in this example, the first power generator GE1) having the smaller voltage drooping characteristic, and the other power generator (in this example, the second power generator GE2) bears the cross current part.

In order to stably perform parallel operation between the different types of power generators GE1 and GE2 while suppressing cross current between the power generators and keeping a load balance, it is required that the voltage drooping characteristics of the power generators coincide with each other and the drooping base points thereof coincide with each other. If the voltage drooping characteristics coincide with each other, the amount of adjustment for cross current share between the power generators GE1 and GE2 becomes small, and a load share ratio is equalized. On the other hand, if the voltage drooping characteristics do not coincide with each other, as described above, in a low load state, significant load current unbalance in load share and cross current occur between the different types of power generators GE1 and GE2. When the load instantaneously reduces, cross current flows to the power generator side (in the example in FIG. 2, the first power generator GE1 side) having the smaller drooping characteristic, and an overcurrent event occurs in which the second power generator GE2 side having the greater drooping characteristic also bears the cross current part.

Figure 3:
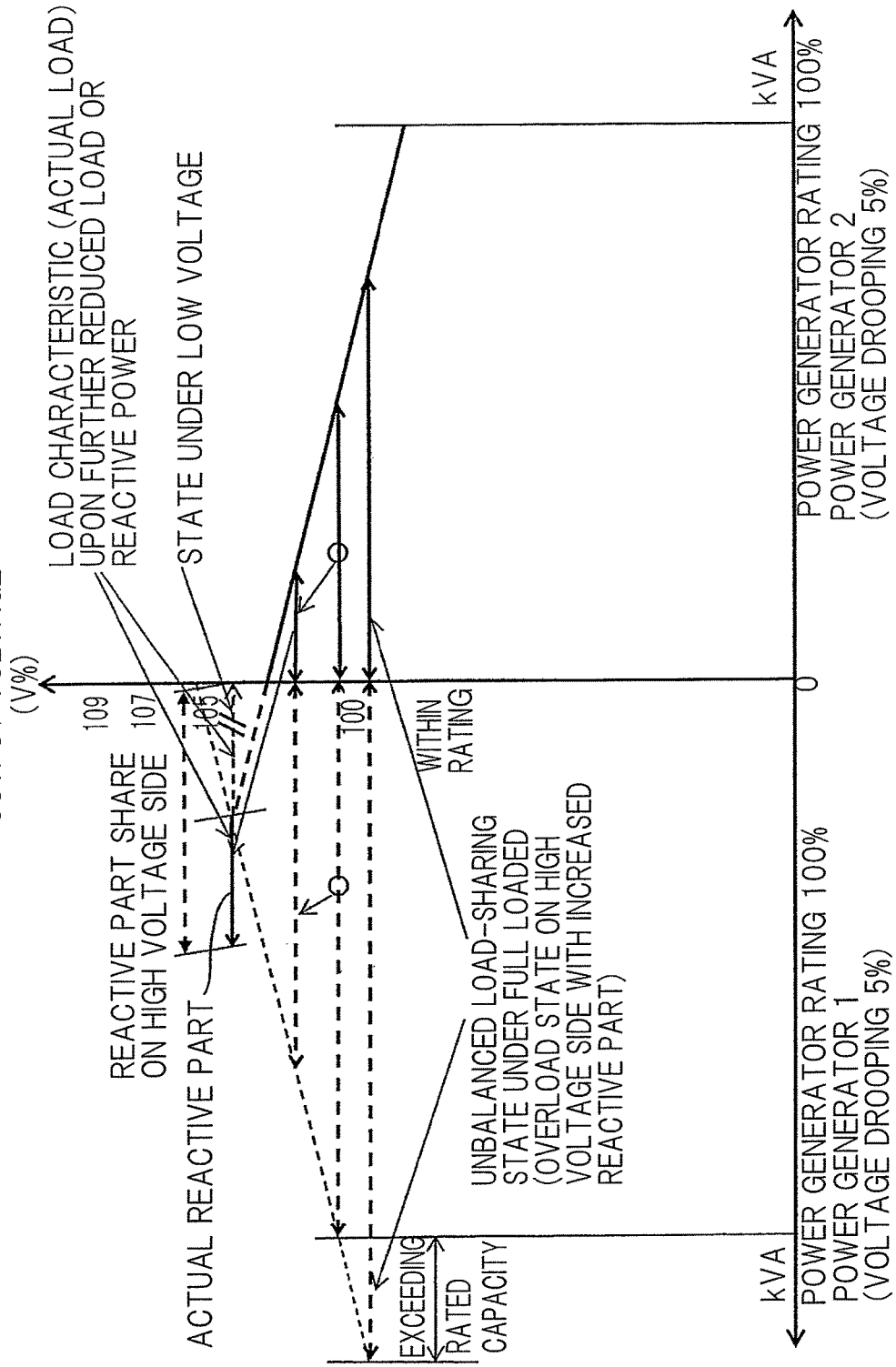
FIG. 3 is a graph showing a state in which bases of voltage drooping characteristics of different types of power generators do not coincide with each other.
Figure 4:
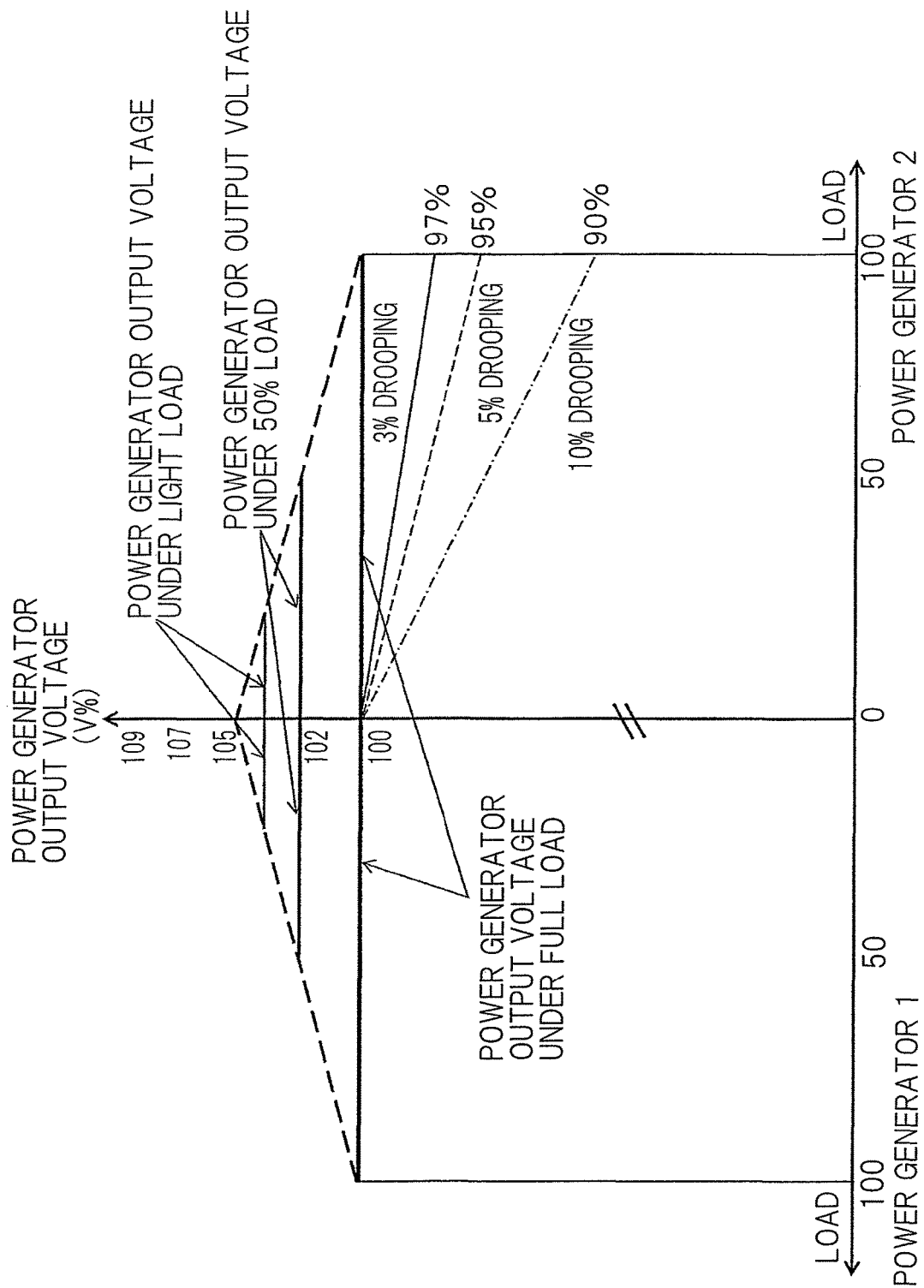
FIG. 4 is a graph showing a state in which voltage drooping characteristics of different types of power generators coincide with each other and bases of the voltage drooping characteristics coincide with each other.

As shown in FIG. 3, even if the power generators GE1 and GE2 have the same voltage drooping characteristic, if the drooping base points thereof do not coincide with each other, a load current unbalance occurs between the different types of power generators GE1 and GE2. However, as shown in FIG. 4, if the voltage drooping characteristics coincide with each other and the bases thereof coincide with each other, load current is equally shared, and cross current between the power generators is suppressed and a sharing balance of static effective/reactive load current is not lost.

Figure 5:
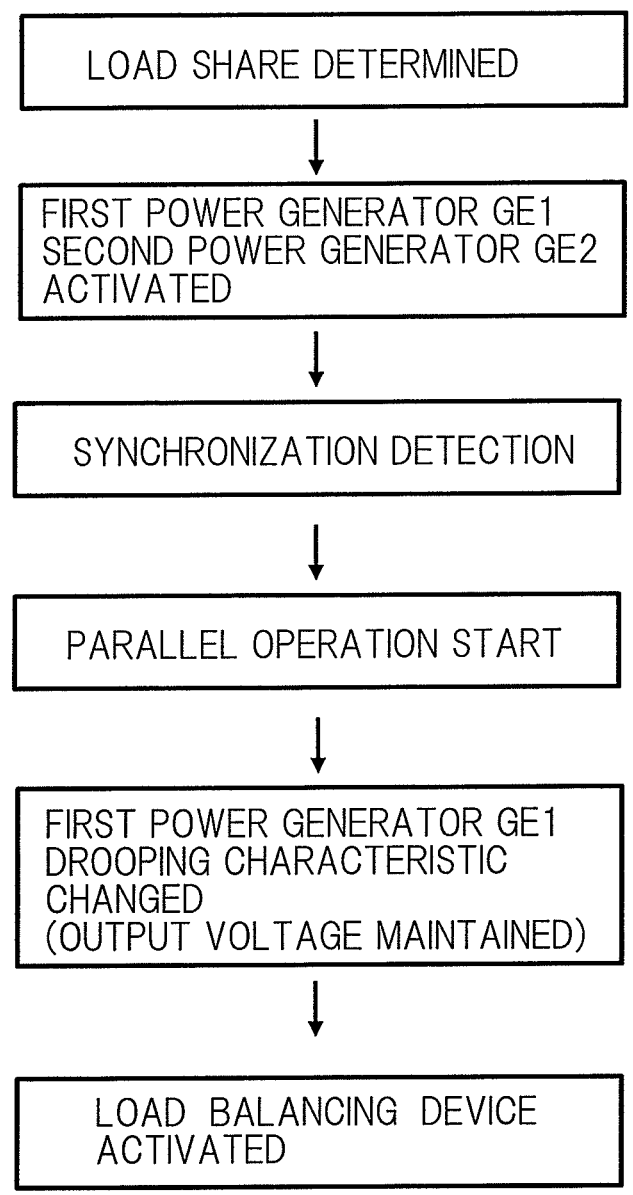
FIG. 5 is a flowchart showing a parallel operation procedure according to the embodiment of the present invention.

FIG. 5 shows a procedure of shifting to parallel operation in the case where the changing of the voltage drooping characteristic is automatically performed. First, load share for parallel operation (typically, for example, a capacity ratio for each power generator) is determined. In this state, the first power generator GE1 and the second power generator GE2 which are different types of power generators are activated by an activation command, and each power generator starts independent operation. More specifically, the shut-off switch 15 on the second power generator GE2 side and the connection shut-off switch 7 are closed in advance, whereby load operation by the second power generator GE2 is performed. Next, as preparation for power feeding to the load L, independent operation of the first power generator GE1 is performed in parallel with independent operation of the second power generator GE2. It is noted that the first power generator GE1 may be operated first. In this case, the shut-off switch 5 is closed instead of the shut-off switch 15.

Next, synchronism detection for the parallel operation is performed. In order to perform parallel operation between the different types of power generators GE1 and GE2, as in normal parallel operation, it is required to satisfy three synchronism detection conditions of (a) power generator output voltage, (b) power generator output frequency, and (c) phase of power generator output voltage. After it is confirmed that these synchronism detection conditions are all satisfied, the shut-off switch 5 on the first power generator GE1 side which is the power generator having the smaller output voltage drooping characteristic is closed. In the case where the power generator that is operated first is the first power generator GE1, the shut-off switch 15 on the second power generator GE2 side is closed.

When a parallel operation starting command for switching the first power generator GE1 and the second power generator GE2 which have been operated independently of each other to parallel operation is issued, through a procedure described in detail below, the voltage drooping characteristic of the first power generator GE1 having the smaller voltage drooping characteristic is changed to coincide with the voltage drooping characteristic of the other second power generator GE2. At this time, output voltage of the first power generator GE1 is maintained in accordance with predetermined load share for reactive current and active current. Immediately after the parallel operation is started, equilibration control for active current may be separately performed, thereby causing the voltage drooping characteristics to coincide with each other at the same time. Thereafter, a reactive current load equilibration device is operated, thereby shifting to a load equilibrium state for reactive current.

Figure 6:
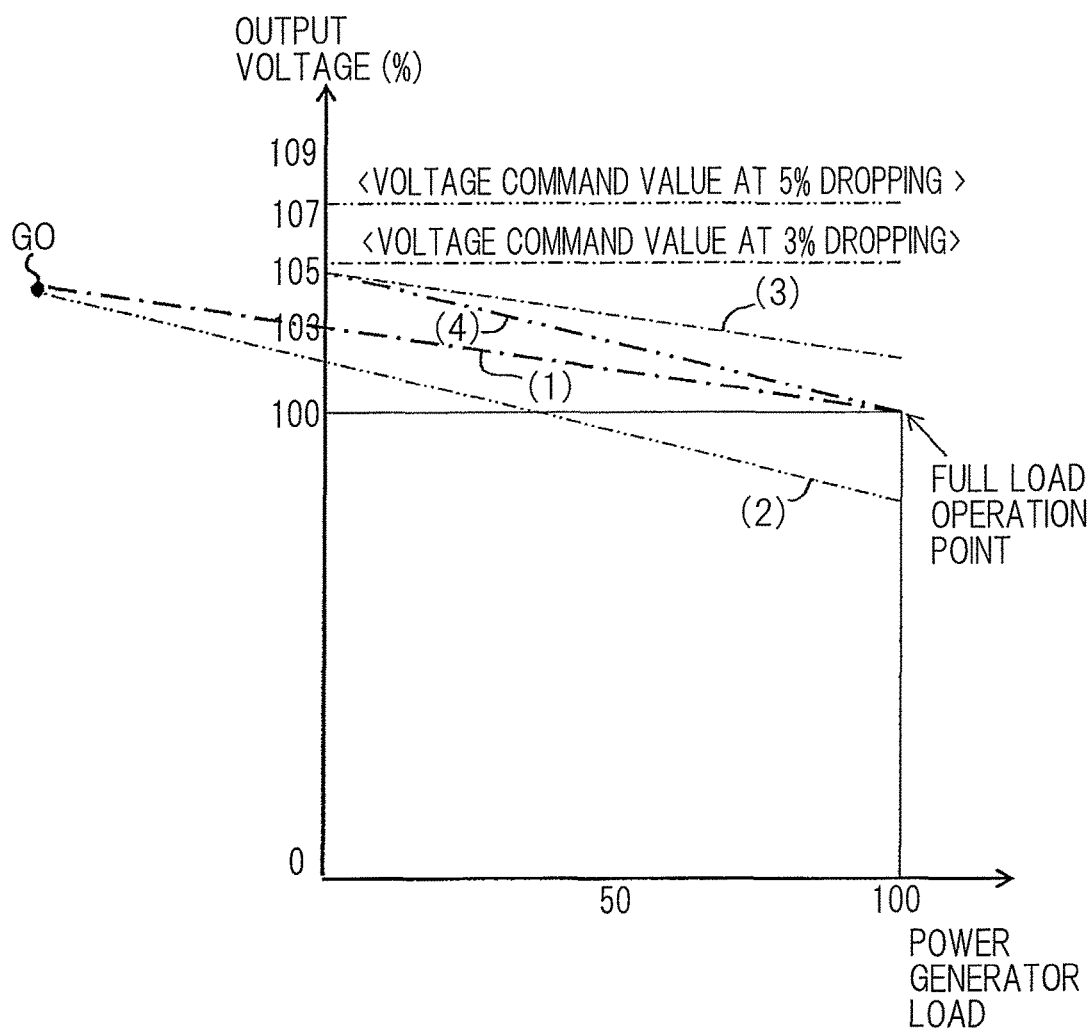
FIG. 6 is a graph for explaining a principle of voltage drooping characteristic changing in full-load operation in the embodiment of the present invention.

At the time of changing the voltage drooping characteristic, as a specific example, the voltage drooping characteristic and the output voltage command value are changed at the same time, based on an optimum operation condition in the independent operation of the first power generator GE1. A principle of the voltage drooping characteristic changing will be described with reference to FIG. 6 and FIG. 7. In FIG. 6 showing the case where the first power generator GE1 bears full load, a state (drooping characteristic is 3% and no-load output voltage is 103%) indicated by a straight line (1) is a state in which the first power generator GE1 is performing independent operation. A straight line (2) indicates a state obtained if only the voltage drooping characteristic is changed to 5% without changing of a base point G0 of the drooping characteristic from the straight line (1). A straight line (3) indicates a state obtained if only the output voltage command value is changed from the state indicated by the straight line (1). By executing a combination of the changing operation from the straight line (1) to the straight line (2) and the changing operation from the straight line (1) to the straight line (3), the straight line (1) indicating the state in which the first power generator GE1 is performing the independent operation is shifted to a straight line (4) indicating a state in which only the voltage drooping characteristic is changed, without causing change in output voltage of the first power generator GE1.

Figure 7:
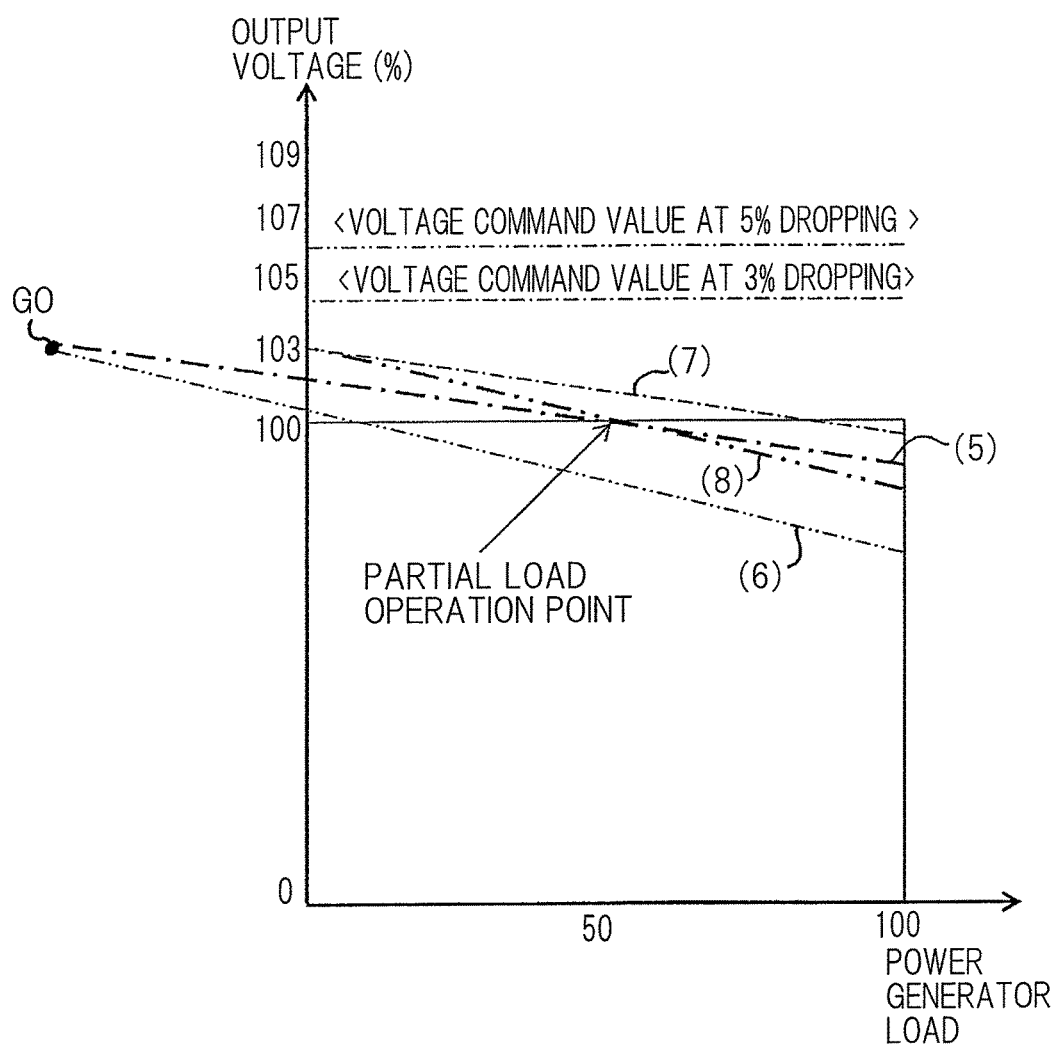
FIG. 7 is a graph for explaining a principle of voltage drooping characteristic changing in partial-load operation in the embodiment of the present invention.

Similarly, also in the case where the first power generator GE1 bears partial load current (for example, 50%), as shown in FIG. 7, from the independent operation state (voltage drooping characteristic is 3% and no-load output voltage is 101.5%) indicated by a straight line (5), a combination of an operation (straight line (6)) of changing the voltage drooping characteristic to 5% without changing the base point G0 of the voltage drooping characteristic, and an operation (straight line (7)) of changing the output voltage command value, is executed, thereby shifting to a straight line (8) indicating a state in which only the voltage drooping characteristic is changed without change in output voltage of the first power generator GE1. As described above, the value of the voltage drooping characteristic indicates a reduction rate from output voltage with load of 100% with respect to a no-load state, and no-load output voltage indicates a ratio of output voltage in a no-load state to output voltage with full-load of 100%.

In the case of releasing the parallel operation to return to independent operation of the first power generator GE1, through a procedure opposite to the voltage drooping characteristic changing procedure performed at the start of parallel operation, only the voltage drooping characteristic is returned to a value in the independent operation, without change in output voltage of the first power generator GE1. That is, from the state in which the first power generator GE1 and the second power generator GE2 are operated in parallel with each drooping characteristic being 5% and with each load share being 50%, load on the second power generator GE2 is shifted to the first power generator GE1 and the voltage drooping characteristic of the first power generator GE1 is returned from 5% to 3%, and at the same time, the output voltage command value is returned to its original value, thereby returning to the original state in which the first power generator GE1 performs independent operation with the voltage drooping characteristic being 3%, without change in output voltage of the first power generator GE1.

Figure 8:
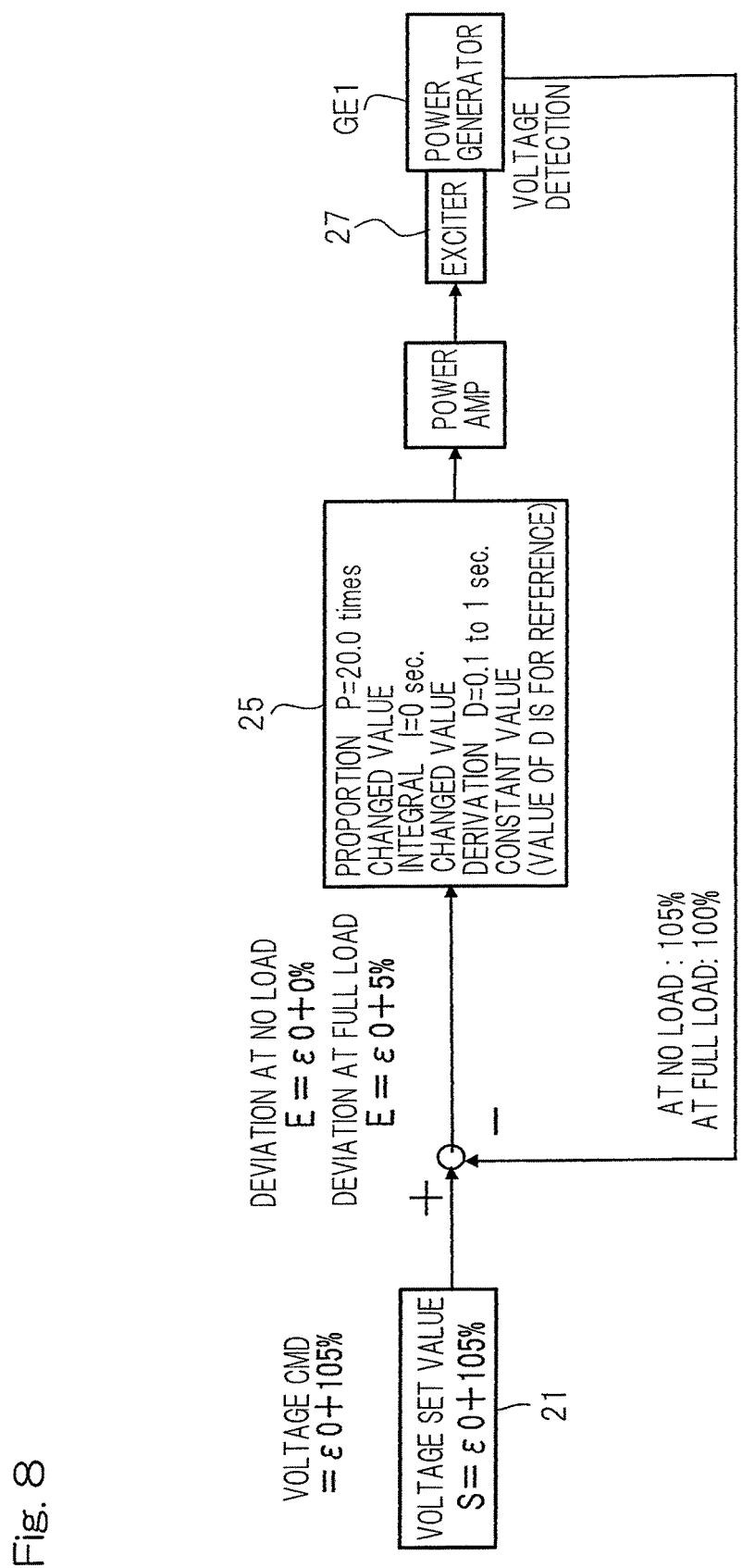
FIG. 8 is a block diagram showing a control method for a voltage drooping proportional gain in the embodiment of the present invention.
Figure 9:
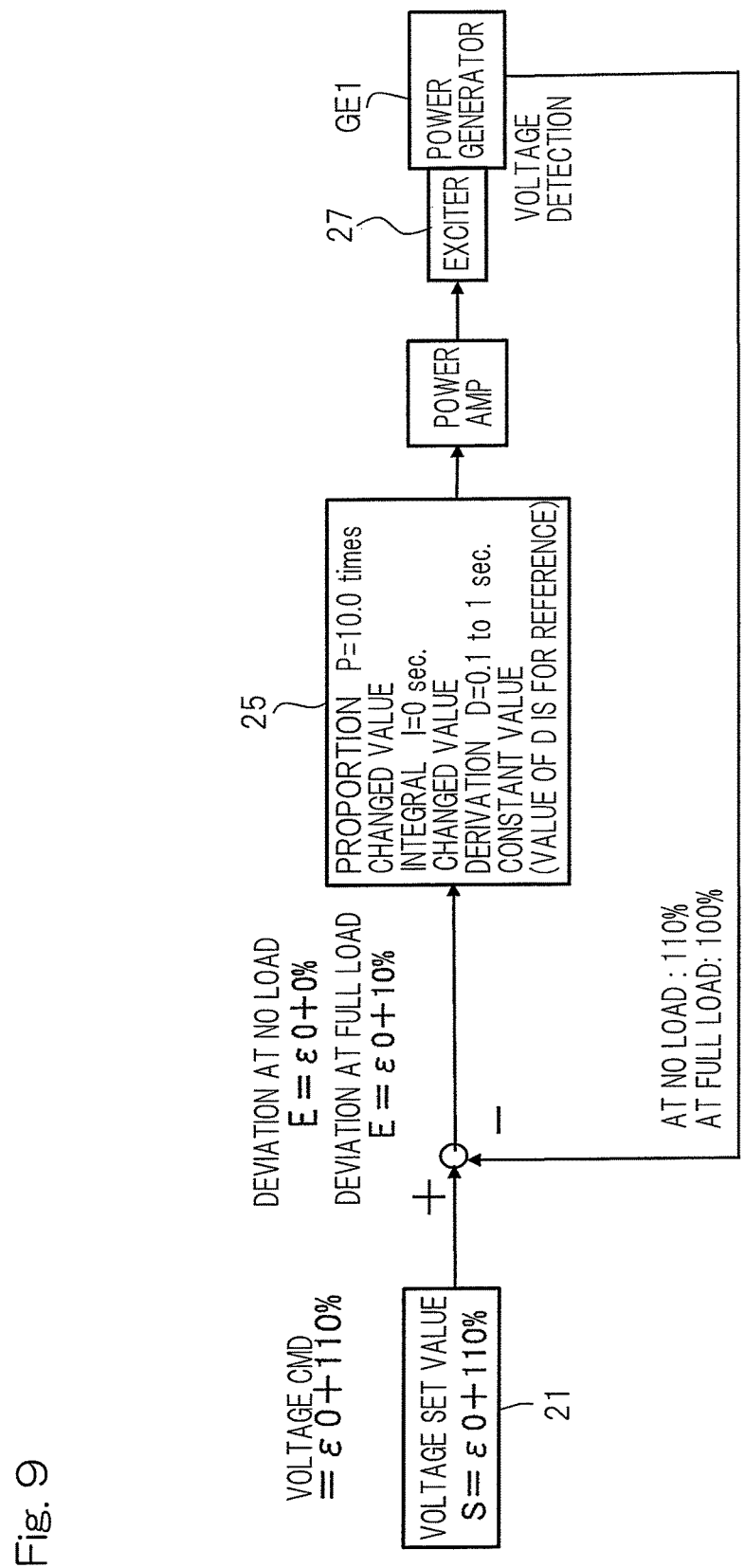
FIG. 9 is a block diagram showing a control method for a voltage drooping proportional gain (in the case where one power generator is a system power supply) in the embodiment of the present invention.
Figure 10:
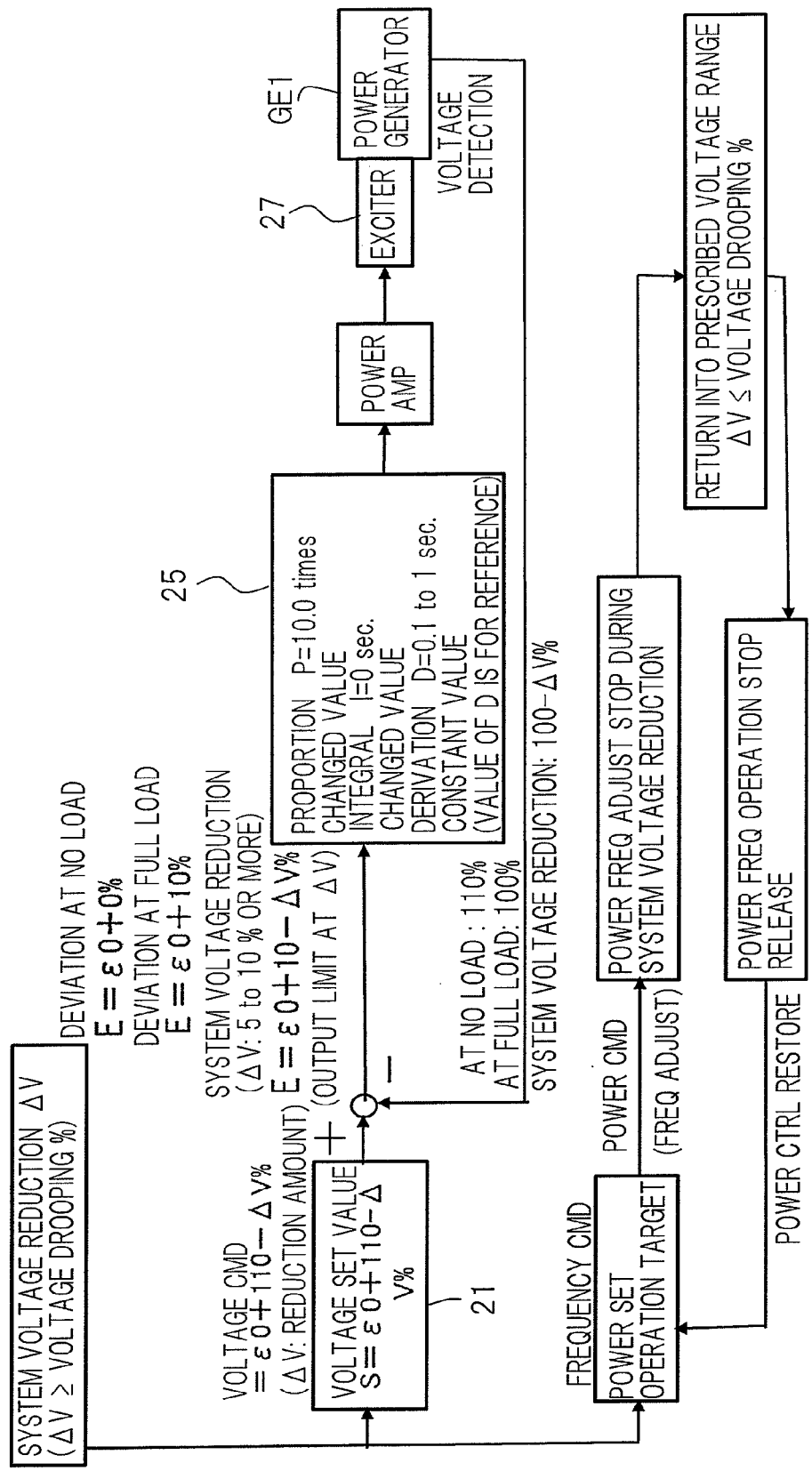
FIG. 10 is a block diagram showing a control method for a voltage drooping proportional gain (in the case where one power generator is a system power supply) in the embodiment of the present invention.

FIGS. 8 to 10 show specific examples of the output voltage control method for parallel operation. In these examples, feedback proportional control is performed in which an output voltage command value set by an output voltage command value setting unit 21 is compared with an output voltage detected value measured by an output voltage detector of the first power generator GE1, a proportional gain setting unit 25 determines a proportional gain based on a deviation therebetween, and an exciter 27 for the power generator is adjusted based on the proportional gain, thereby controlling output voltage.

FIG. 8 shows an example of the control method in parallel operation between different types of synchronous power generators. More specifically, FIG. 8 shows the control method for performing parallel operation between the first power generator GE1 having a voltage drooping characteristic of 3% and the second power generator GE2 having a voltage drooping characteristic of 5% so as to make their drooping characteristics coincide with each other at 5%. In this example, a voltage setting value S is set to $\epsilon 0+105\%$, and a proportional gain P is set to 20.0 times. It is noted that $\epsilon 0$ is a value in a no-load state.

In the present embodiment, the voltage drooping characteristic is changed from 3% to 5% as an example. By thus changing the proportional gain for the proportional control, the value of the voltage drooping characteristic can be arbitrarily changed. Further, by changing the output voltage command value as well as the drooping characteristic, it becomes possible to change only the value of the voltage drooping characteristic while keeping output voltage of the power generator. In FIG. 8, the voltage setting value in the case of drooping by 5% is $S=\epsilon 0+105\%$, and the voltage setting value in the case of drooping by 10% is $S=\epsilon 0+110\%$.

In the case where one of the power generators to be operated in parallel is a power generator requiring large starting current, for example, an induction power generator employed as a wind turbine power generator, a synchronous power generator receives excessive current from the induction power generator at the start of parallel operation. In order to reduce this, during occurrence of the excessive current, the voltage setting value S is set to be lower than the value (in this example, $S=\epsilon 0+105\%$) based on the voltage drooping characteristic. Preferably, the voltage setting value S in this case is set to be, for example, 70 to 90% of the value based on the voltage drooping characteristic. As a result, the starting current is reduced to about 50 to 80% as compared to the case of setting the voltage setting value S to the value based on the voltage drooping characteristic. After a time in which the starting current rushes has elapsed, the voltage command value S is changed to the value based on the voltage drooping characteristic, thereby returning the voltage value to a prescribed value. Such control is particularly effective in the case where the starting current of one power generator corresponds to 20 to 50% of short-circuit current. Instead of changing the voltage setting value, it is also effective to greatly increase the voltage drooping amount in the voltage drooping characteristic, for example, change the voltage drooping amount, which is normally 3% to 5%, to 20% to 30%, while maintaining the voltage setting value. Also in the case where, during independent operation of a power generator having a small capacity, an induction power generator having a larger capacity than the power generator capacity is applied, changing the voltage command value in accordance with the application timing or temporarily changing the voltage drooping characteristic is effective for reduction in the starting current.

According to this control method, even in the case where a synchronous power generator, and an induction power generator accompanied with large starting current are operated in parallel, the voltage drooping characteristic or the voltage setting value of the synchronous power generator is arbitrarily changed, whereby occurrence of instantaneous excessive current at the start of the parallel operation can be suppressed. Along with decrease in such initial transient current, the voltage drooping characteristic is returned to a value in the normal operation, and the voltage value is returned to a prescribed value. Also in the case of performing operation with induction load in a self-sustaining power conditioner or in a UPS device performing independent operation, the same control for reducing initial transient current can be performed. Regarding the changing of the voltage drooping characteristic, the voltage drooping amount may be instantaneously changed or gradually changed, while the voltage value in the operation is maintained.

FIG. 9 shows a control method in the case of operating the power generator and the system power supply in parallel, particularly, a control method in the case where steady operation is performed in the parallel operation between the power generator and the system power supply. On the other hand, FIG. 10 shows a control method in the case where great voltage reduction has occurred in the system power supply, in the parallel operation between the power generator and the system power supply. In the steady parallel operation between the power generator and the system power supply in FIG. 9, the voltage setting value S for the power generator that is performing independent operation in the example in FIG. 8 may be changed to, as a value for parallel operation with the system power supply, for example, $\epsilon 0+110\%$, and the proportional gain P may be set to 10.0 times.

Figure 11:
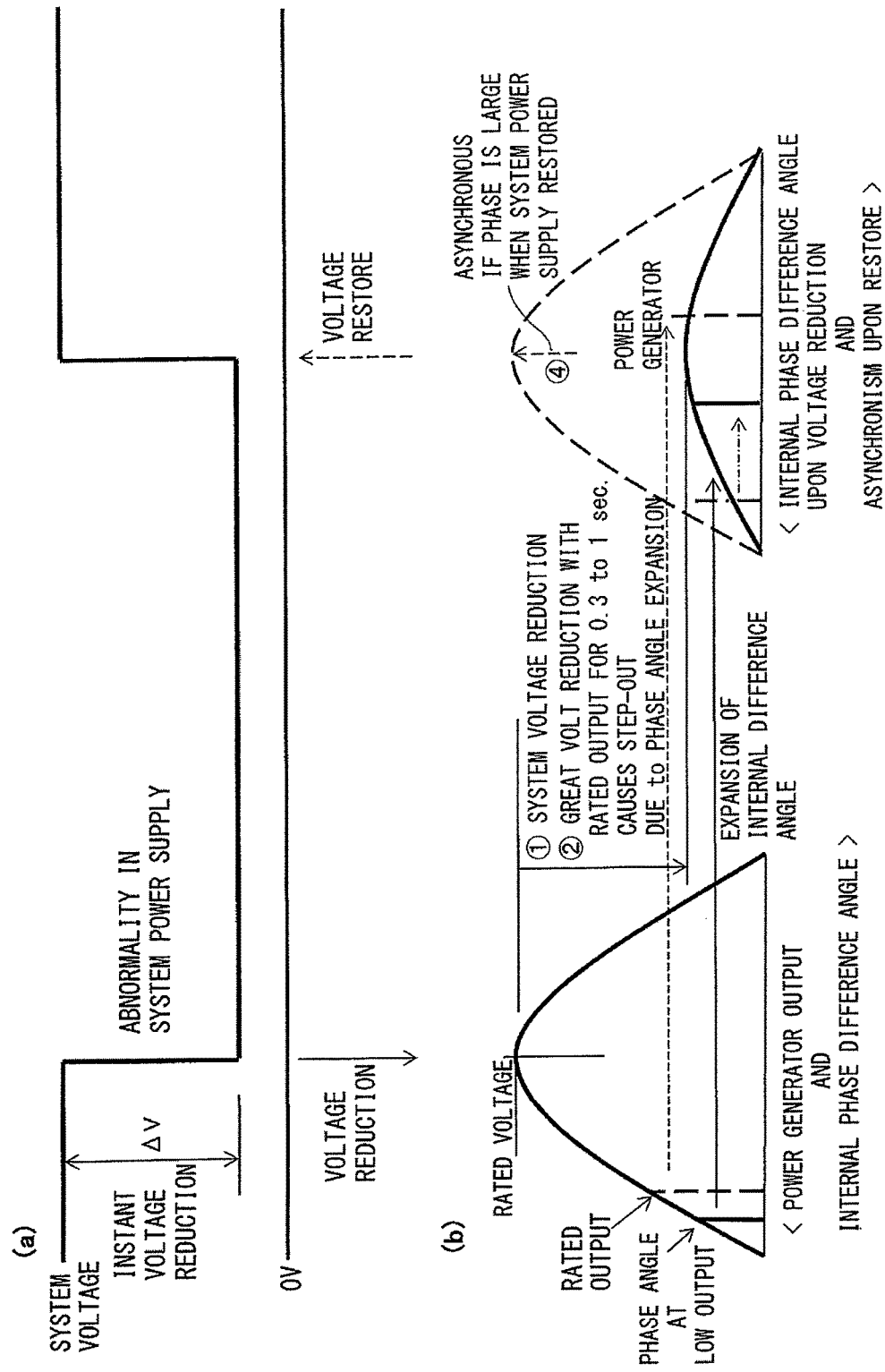
FIGS. 11(a) and (b) show the analysis of influence on an interconnected power generator due to instantaneous voltage reduction on a system power supply side in the present invention.

On the other hand, as shown in FIG. 11, in the case where great voltage reduction ($\Delta V \%$) has occurred instantaneously in the system power supply, normally, excessive reactive current or power swing occurs in the counterpart power generator operated in parallel. Chart (a) in FIG. 11 schematically shows voltage change in the system power supply when instantaneous voltage reduction has occurred in the system power supply, and Chart (b) in FIG. 11 shows change in output voltage and an internal phase angle of the power generator in response to change in the system power supply voltage. Sharp voltage reduction in the system power supply has a great influence also on the counterpart power generator. That is, in the counterpart power generator, excessive current represented by $1/Xd'' \times$voltage reduction rate ($Xd''$: initial transient reactance in the power generator) occurs during the voltage reduction in the system power supply. If the voltage reduction in the system power supply continues, the internal phase angle of the power generator expands, leading to step-out of the interconnected power generator in a short time (for example, 0.3 to 1.0 sec). In the case where voltage of the system power supply returns during the expansion of the internal phase angle of the power generator, due to the expansion of a phase difference between the power generator and the system power supply, an asynchronous running event occurs between the power generator and the system power supply. Impact in this case becomes about $1/Xd'' \times 2$ times when the internal phase angle of the power generator is maximum (at a phase angle just before step-out of the power generator), so that not only excessive reactive current occurs but also burden of excessive effective power occurs on the interconnected power generator.

In order to avoid such a situation, as shown in FIG. 10, a voltage value of a system power supply bus is constantly monitored, and when great voltage reduction has occurred instantaneously in the system power supply, specifically, for example, when voltage reduction ($\Delta V \%$) exceeding the voltage drooping characteristic value of the power generator operated in parallel has occurred, a voltage command value obtained by adding the voltage drooping characteristic value of the power generator to the reduction amount of the bus voltage value is given. In other words, operation is performed so as to follow the voltage command value according to the voltage reduction amount on the system power supply side. That is, the output voltage command value for the power generator operated in parallel is reduced in accordance with the voltage reduction amount. Further, for a power command (target) set for the power generator operated in parallel, power output reducing control is performed in accordance with the voltage reduction amount. The voltage reduction amount ΔV % for performing such control is set to be, for example, not less than 5%, within a range of 1.5 to 2.5 times of the drooping characteristic value (%) (that is, in this example, 7.5 to 12.5%).

In the case of releasing the parallel operation, an operation is performed through a procedure opposite to the procedure performed at the start of the parallel operation described above. That is, from the state in which the first power generator GE1 and the second power generator GE2 are operated in parallel in the present embodiment, the load is shifted as necessary, and thereafter, the connection shut-off switch 7 in FIG. 1 is opened, whereby a voltage drooping characteristic restorative change command is issued, and the drooping characteristic of the first power generator GE1 is changed to return from 5% to the original value 3%. Thus, also in release of parallel operation, the power generator operation can be returned to the original optimum state by changing the drooping characteristic of the first power generator GE1. Therefore, operation with the drooping characteristic changed is performed only when parallel operation is needed, and a power generator to perform independent operation can be operated in an optimum condition when parallel operation is not needed and independent operation is to be performed.

The above description mainly shows the control method in the case of automatically starting a parallel operation condition for changing the voltage drooping characteristic. However, the changing of the drooping characteristic can be manually started. In the case of manually starting the changing of the drooping characteristic, a drooping change start command may be manually given to change the drooping characteristic, and thereafter, the parallel operation start operation may be performed. The other procedure is the same as in the case of automatic changing.

Figure 12:
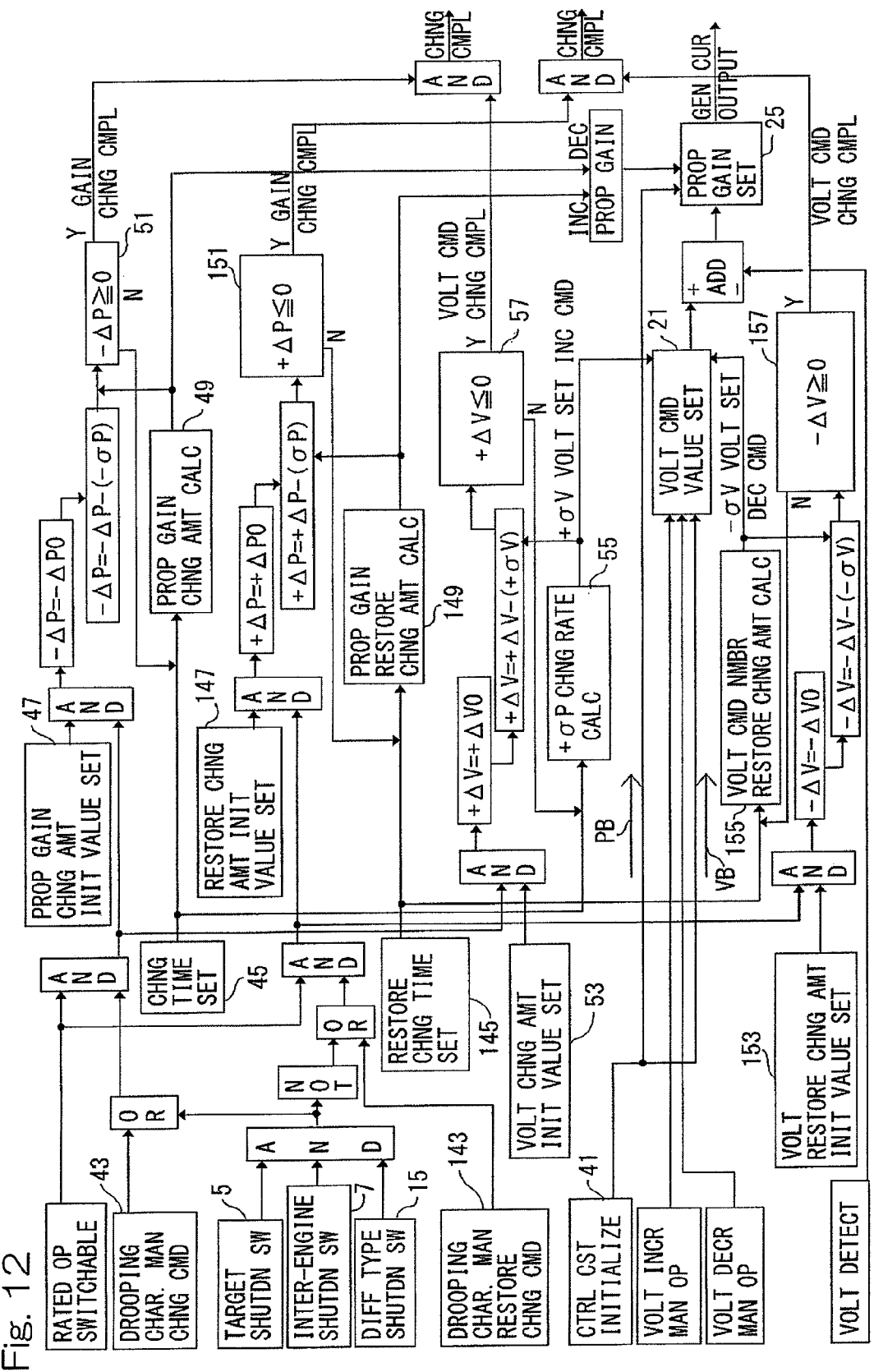
FIG. 12 is a block diagram showing a voltage control system according to the embodiment of the present invention.

Hereinafter, a control flow for changing the voltage drooping characteristic will be described in detail with reference to a control block diagram shown in FIG. 12.

At the start of parallel operation, first, in response to a starting signal for a power generator, a control logic is initialized. Specifically, in response to an initialization command signal from a control constant initialization unit 41, a proportional gain initial value PB is set for the proportional gain setting unit 25, and an output voltage setting initial value NB is set for the voltage command value setting unit 21. Every time a command to change the voltage drooping characteristic is issued, the proportional gain is changed. Changing of output voltage by the voltage command value setting unit 21 can be always performed, and a rated operation condition of output voltage may be provided as an interlock.

An operation to change the voltage drooping characteristic is started when a drooping characteristic change allowed signal and a drooping characteristic change command signal are received. As the drooping characteristic change allowed signal, normally, a rated voltage signal of a power generator is used.

The drooping characteristic change command signal is sent when one of a drooping characteristic change command for automatic changing or a drooping characteristic change command for manual changing is issued. The drooping characteristic change command signals in the case of automatic changing and in the case of manual changing are respectively given as follows.

In the case of automatic changing, normally, when ON signals of the shut-off switch (in the example in FIG. 1, the first shut-off switch) 5 for one-type power generator, the shut-off switch (in the example in FIG. 1, the second shut-off switch) 15 for different-type power generator, and the connection shut-off switch 7 are all inputted, the drooping characteristic change command signal for automatic changing is issued. In the case of manual changing, the drooping characteristic change command signal is manually sent from a drooping characteristic manual change command unit 43. If the shut-off switch 5 for one-type generator, the shut-off switch 15 for different-type generator, and the connection shut-off switch 7 are all closed before the manual signal is inputted from the drooping characteristic manual change command unit 43, changing of the voltage drooping characteristic is automatically started.

A change period setting unit 45 sets a gradual change period for changing the voltage drooping characteristic. If the change period is set at 0, the voltage drooping characteristic is instantaneously changed, and if the change period is set at a value other than 0, the voltage drooping characteristic is gradually changed with a specified time.

When a condition for starting the drooping characteristic changing is satisfied, a proportional gain change amount initial value setting unit 47 sets an initial value of a change amount of the proportional gain according to the changing of the voltage drooping characteristic. When the proportional gain change amount is fully added, the changing of the proportional gain is completed.

A proportional gain change amount calculation unit 49 calculates a proportional gain change rate per certain cycle (normally, sampling time of control system), from the change period of the voltage drooping characteristic and the proportional gain change amount, and performs subtraction from a proportional gain operation value in accordance with the change rate. In the case where the change period of the voltage drooping characteristic is set at 0, the proportional gain change amount becomes equal to the proportional gain change rate. Therefore, the full amount of the proportional gain change amount is subtracted instantaneously (that is, in one cycle of sampling time), whereby the drooping characteristic changing is completed. On the other hand, in the case where the setting is performed so that the voltage drooping characteristic is gradually changed, the proportional gain change rate is subtracted from the initial value of the proportional gain change amount in every certain cycle.

A drooping characteristic change determination unit 51 determines whether or not the changing by the proportional gain change amount has completed. The subtraction of the proportional gain is ended when it is determined that the changing by the proportional gain change amount has completed.

When the condition for starting the drooping characteristic changing is satisfied, a voltage change amount initial value setting unit 53 sets an initial value of a change amount of the output voltage command value for the drooping characteristic changing. When the output voltage command value change amount is fully added, the changing of the output voltage command value is completed.

A voltage command value change amount calculation unit 55 calculates a rotation command value change rate per certain cycle (normally, sampling time of control system), from the output voltage command value change amount and the change period of the voltage drooping characteristic set by the change period setting unit 45, and performs subtraction from an operation value of the output voltage command value setting unit 21 in accordance with the change rate. In the case where the change period of the voltage drooping characteristic is set at 0, the output voltage command value change amount becomes equal to the output voltage command value change rate. Therefore, the full amount of the output voltage command value change amount is subtracted instantaneously (that is, in one cycle of sampling time), whereby the changing of the output voltage command value is completed. On the other hand, in the case where the setting is performed so that the voltage drooping characteristic is gradually changed, the output voltage command value change rate is subtracted from the initial value of the output voltage command value change amount in every certain cycle.

An output voltage command value change determination unit 57 determines whether or not the changing by the output voltage command value change amount has completed. The subtraction of the output voltage command value is ended when it is determined that the changing by the output voltage command value change amount has completed.

Next, the control method in the case of releasing (parallel-off) parallel operation will be described. In the following description, in parallel-off, change to return the voltage drooping characteristic from a value (in the present embodiment, 5%) in parallel operation to a value (in the present embodiment, 3%) in independent operation is referred to as "restorative change". In parallel-off, in response to a drooping characteristic restorative change allowed signal and a drooping characteristic restorative change command signal, a drooping characteristic restorative change operation is started. As the drooping characteristic restorative change allowed signal, normally, a rated voltage signal of a power generator is used.

The drooping characteristic restorative change command signal is sent when one of a drooping characteristic restorative change command for automatic changing or a drooping characteristic restorative change command for manual changing is issued. The drooping characteristic restorative change command signals in the case of automatic changing and in the case of manual changing are respectively given as follows.

In the case of automatic changing, normally, when at least one of the shut-off switch 5 for one-type power generator, the engine connection shut-off switch 17, and the shut-off switch 15 for different-type power generator is opened, a drooping characteristic restorative change command signal is issued. In the case of manual changing, the drooping characteristic restorative change command signal is manually sent from a drooping characteristic manual restorative change command unit. If at least one of the shut-off switch 5 for one-type power generator, the connection shut-off switch 7, and the shut-off switch 15 for different-type power generator is opened before the manual signal is inputted from the drooping characteristic manual restorative change command unit 143, restorative change of the drooping characteristic is automatically performed.

A restorative change period setting unit 145 sets a gradual change period for performing restorative change of the voltage drooping characteristic. If the change period is set at 0, the voltage drooping characteristic is instantaneously changed, and if the change period is set at a value other than 0, restorative change of the voltage drooping characteristic is gradually performed with a specified time.

When a condition for starting the drooping characteristic restorative change is satisfied, a proportional gain restorative change amount initial value setting unit 147 sets an initial value of a restorative change amount of the proportional gain according to the restorative change of the voltage drooping characteristic. When the proportional gain restorative change amount is fully added, the restorative change of the proportional gain is completed.

A proportional gain restorative change amount calculation unit 149 calculates a proportional gain change rate per certain cycle (normally, sampling time of control system), from the change period of the voltage drooping characteristic and the proportional gain restorative change amount, and performs subtraction from a proportional gain operation value in accordance with the change rate. In the case where the restorative change period of the voltage drooping characteristic is set at 0, the proportional gain restorative change amount becomes equal to the proportional gain change rate. Therefore, the full amount of the proportional gain restorative change amount is subtracted instantaneously (that is, in one cycle of sampling time), whereby the drooping characteristic restorative change is completed. On the other hand, in the case where the setting is performed so that restorative change of the voltage drooping characteristic is gradually performed, the proportional gain change rate is subtracted from the initial value of the proportional gain restorative change amount in every certain cycle.

A drooping characteristic restorative change determination unit 151 determines whether or not the changing by the proportional gain restorative change amount has completed. The subtraction of the proportional gain is ended when it is determined that the changing by the proportional gain restorative change amount has completed.

When the condition for starting the drooping characteristic restorative change is satisfied, an output voltage restorative change amount initial value setting unit 153 sets an initial value of a restorative change amount of the output voltage command value for the drooping characteristic restorative change. When the output voltage command value restorative change amount is fully added, the restorative change of the output voltage command value is completed.

An output voltage command value restorative change amount calculation unit 155 calculates an output voltage command value change rate per certain cycle (normally, sampling time of control system), from the output voltage command value restorative change amount and the restorative change period of the voltage drooping characteristic set by the restorative change period setting unit, and performs subtraction from an operation value of the output voltage command value setting unit 21 in accordance with the change rate. In the case where the restorative change period of the voltage drooping characteristic is set at 0, the output voltage command value restorative change amount becomes equal to the output voltage command value change rate. Therefore, the full amount of the output voltage command value restorative change amount is subtracted instantaneously (that is, in one cycle of sampling time), whereby the restorative change of the output voltage command value is completed. On the other hand, in the case where the setting is performed so that restorative change of the voltage drooping characteristic is gradually performed, the output voltage command value change rate is subtracted from the initial value of the output voltage command value restorative change amount in every certain cycle.

An output voltage command value restorative change determination unit 157 determines whether or not the restorative change by the output voltage command value restorative change amount has completed. The subtraction of the output voltage command value is ended when it is determined that the restorative change by the output voltage command value restorative change amount has completed.

In this control system, not only in the case where a parallel-off signal is issued during parallel operation between the first power generator GE1 and the second power generator GE2 which are an example of a combination of different types of power generators, but also in the case where parallel operation is suddenly cancelled for some reason, by obtaining this release command, the voltage drooping characteristic of the first power generator GE1 having a high drooping characteristic can be automatically changed to return from 5% in parallel operation to 3% after parallel-off, without change in output voltage.

Thus, the parallel operation control method for the power generators according to the present embodiment makes it possible to stably perform parallel operation between synchronous power generators having different voltage drooping characteristics, parallel operation between a synchronous power generator and an induction power generator, and parallel operation between a synchronous power generator and a system power supply, although, conventionally, such operations are difficult. Therefore, parallel operation between different types of power generators or between a power generator and a system power supply can be stably performed without loss of performance of each power generator.

Although the embodiments of the present invention have been thus described with reference to the drawings, various additions, modifications, or deletions may be performed without deviating from the gist of the present invention. Accordingly, such additions, modifications, and deletions are to be construed as included in the scope of the present invention.

REFERENCE NUMERALS

1 . . . Control system
19 . . . System power supply
GE1 . . . First power generator (Power generator)
GE2 . . . Second power generator (Power generator)
L Load (Drive target)

What is claimed is:

1. A control method for parallel operation between different types of power generators, control being performed in shifting a plurality of different types of power generators to a parallel operation, and the control method comprising:
changing at least one of output voltage and a voltage drooping characteristic of at least one of the plurality of power generators,
wherein the plurality of different types of power generators are a plurality of synchronous power generators having respective different voltage drooping characteristics, the control method being a method for controlling output voltage in shifting the plurality of power generators from an independent operation of each of the power generators under respective different voltage drooping characteristic thereof to the parallel operation, the control method further comprising:
changing the voltage drooping characteristic of one power generator having a smaller voltage drooping characteristic among the plurality of power generators to be operated in parallel, so as to coincide with the voltage drooping characteristic of a second of the power generators; and
controlling, at a time of changing the voltage drooping characteristic, the other power generator so that the output voltage thereof is maintained at a value before start of the parallel operation.

2. A control system for parallel operation between different types of power generators, control being performed in shifting a plurality of different types of power generators to a parallel operation, and the control system comprising:
a unit configured to change at least one of output voltage and a voltage drooping characteristic of at least one of the plurality of power generators;
wherein the plurality of different types of power generators are a plurality of synchronous power generators having respective different voltage drooping characteristics, the control system being a system for controlling output voltage in shifting the plurality of power generators from an independent operation of each of the power generators under respective different voltage drooping characteristic thereof to the parallel operation, the control system further comprising:
a unit configured to change the voltage drooping characteristic of one power generator having a smaller voltage drooping characteristic among the plurality of power generators to be operated in parallel, so as to coincide with the voltage drooping characteristic of a second of the power generators; and
a unit configured to maintain, at a time of changing the voltage drooping characteristic, the output voltage of the other power generator at a value before start of the parallel operation.

* * * * *